United States Patent
Hong et al.

(10) Patent No.: US 6,799,850 B2
(45) Date of Patent: Oct. 5, 2004

(54) IMAGE PROJECTING APPARATUS HAVING OPTICAL SWITCH

(75) Inventors: Chang-wan Hong, Suwon (KR); Sang-whoe Dho, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 0 days.

(21) Appl. No.: 10/660,736

(22) Filed: Sep. 12, 2003

(65) Prior Publication Data

US 2004/0080714 A1 Apr. 29, 2004

(30) Foreign Application Priority Data

Sep. 17, 2002 (KR) .......................... 2002-56348

(51) Int. Cl.[7] .................... G03B 21/00; G03B 21/28; G02B 7/18; G02B 5/04; G02F 1/1335
(52) U.S. Cl. ...................... 353/30; 353/31; 353/33; 353/38; 353/81; 353/122; 345/39; 345/46; 345/82; 345/83; 348/804; 359/831; 359/834; 359/837; 349/8
(58) Field of Search ............................ 353/30, 31, 33, 353/38, 81, 122; 345/39, 46, 82, 83; 348/804; 359/831, 834, 837, 8

(56) References Cited

U.S. PATENT DOCUMENTS

| 3,872,451 A | * | 3/1975 | McNaney | 365/117 |
| 4,098,548 A | * | 7/1978 | McNaney | 359/263 |
| 6,227,669 B1 | * | 5/2001 | Tiao et al. | 353/31 |
| 6,547,400 B1 | * | 4/2003 | Yokoyama | 353/98 |
| 6,733,135 B2 | * | 5/2004 | Dho | 353/31 |
| 2004/0017546 A1 | * | 1/2004 | Agostinelli et al. | 353/7 |

* cited by examiner

Primary Examiner—Russell Adams
Assistant Examiner—Melissa J Koval
(74) Attorney, Agent, or Firm—Sughrue Mion, PLLC

(57) ABSTRACT

An image projecting apparatus has optical switches in first optical switch unit arranged in a square matrix arrangement, and a second optical switch unit of optical switches in single file for selectively reflecting the monochromatic lights reflected from the first optical switch unit. A light source irradiates a plurality of monochromatic lights of different wavelengths and the monochromatic lights are passed through the optical switches and a square beam generator such that they are incident on a panel unit to realize a monochromatic color stripe of a predetermined size. Light utilization increases through the use of first and second optical switch units, and overlapping between monochromatic color stripes can be prevented through the use of digital micromirror device (DMD) panel or liquid crystal on silicon (LCOS) panel of fast responsiveness.

7 Claims, 9 Drawing Sheets

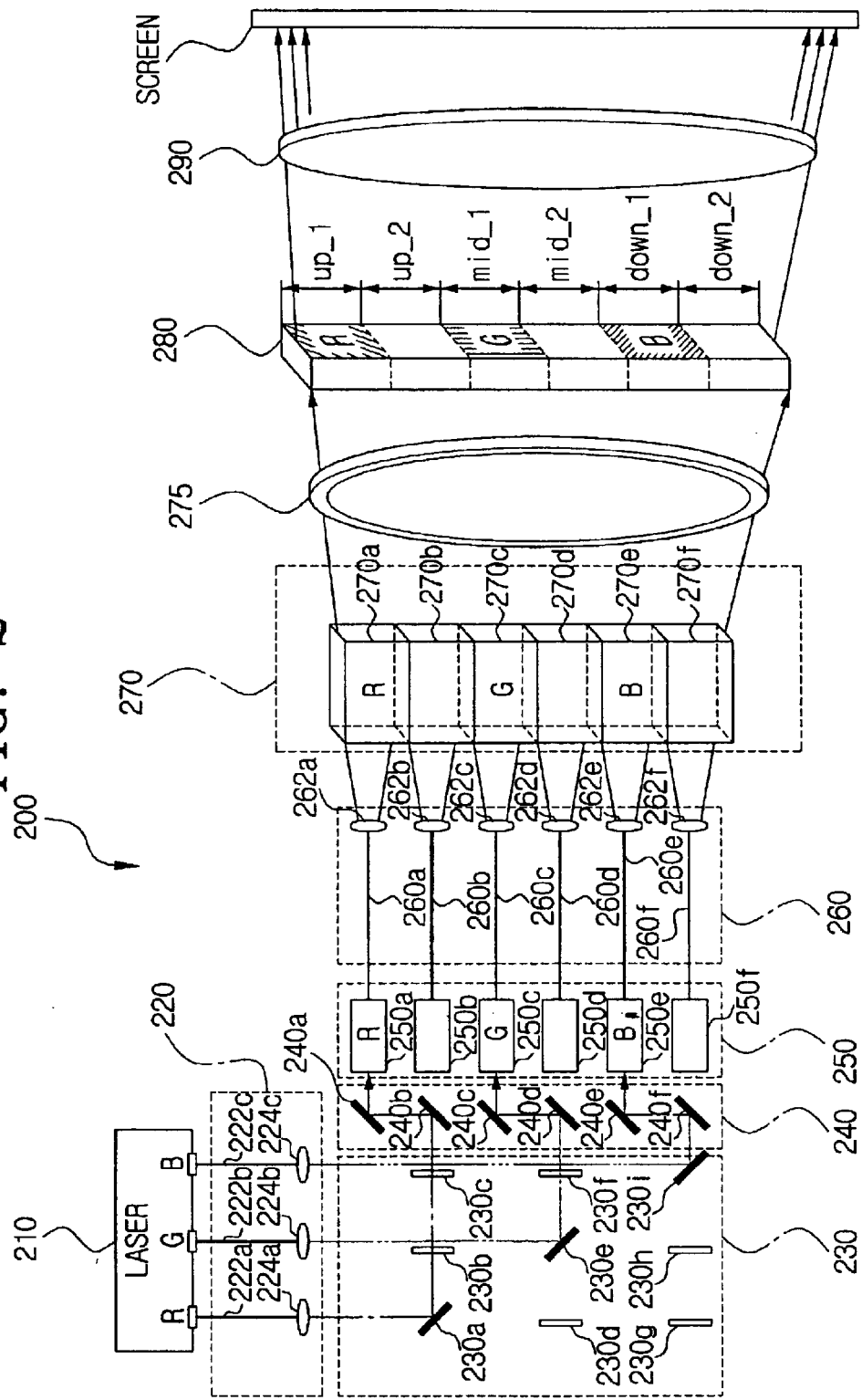

FIG. 3C
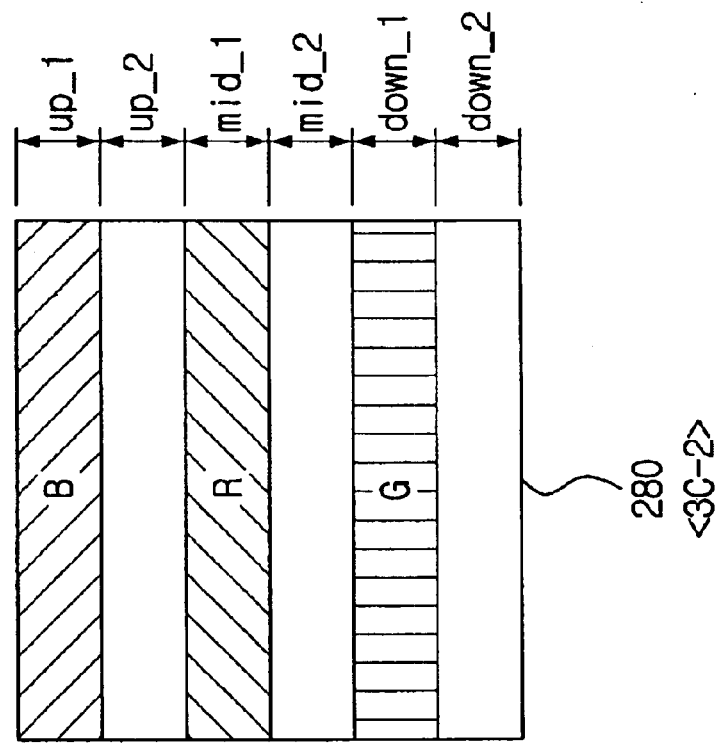
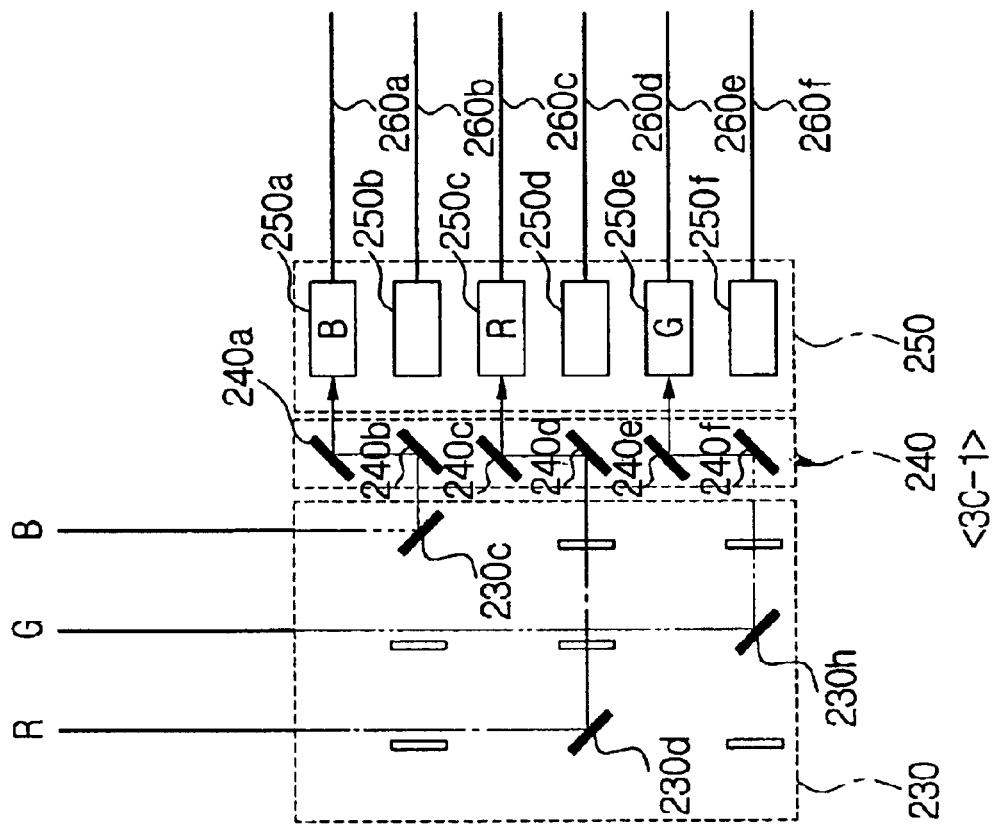

FIG. 3D
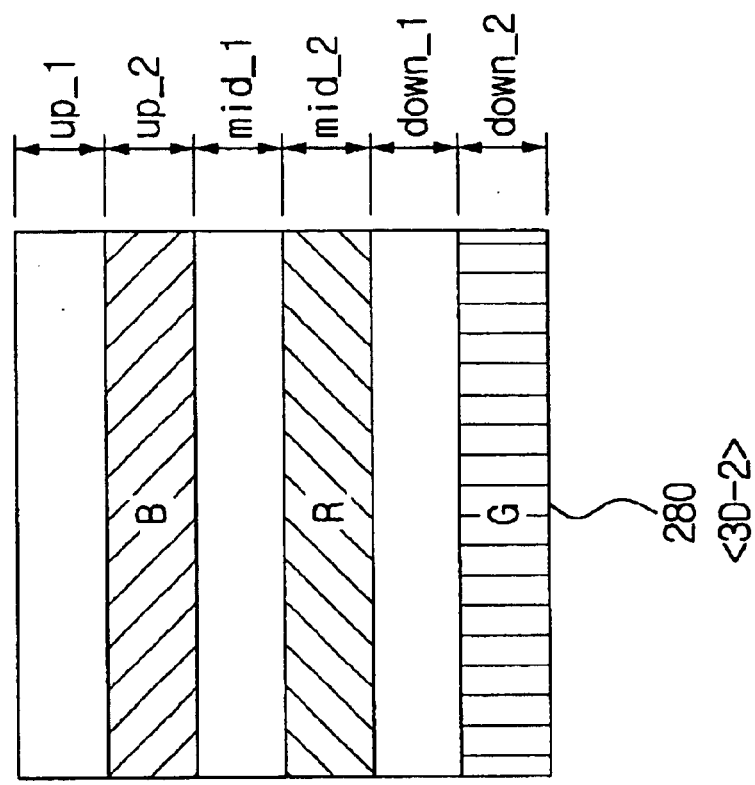
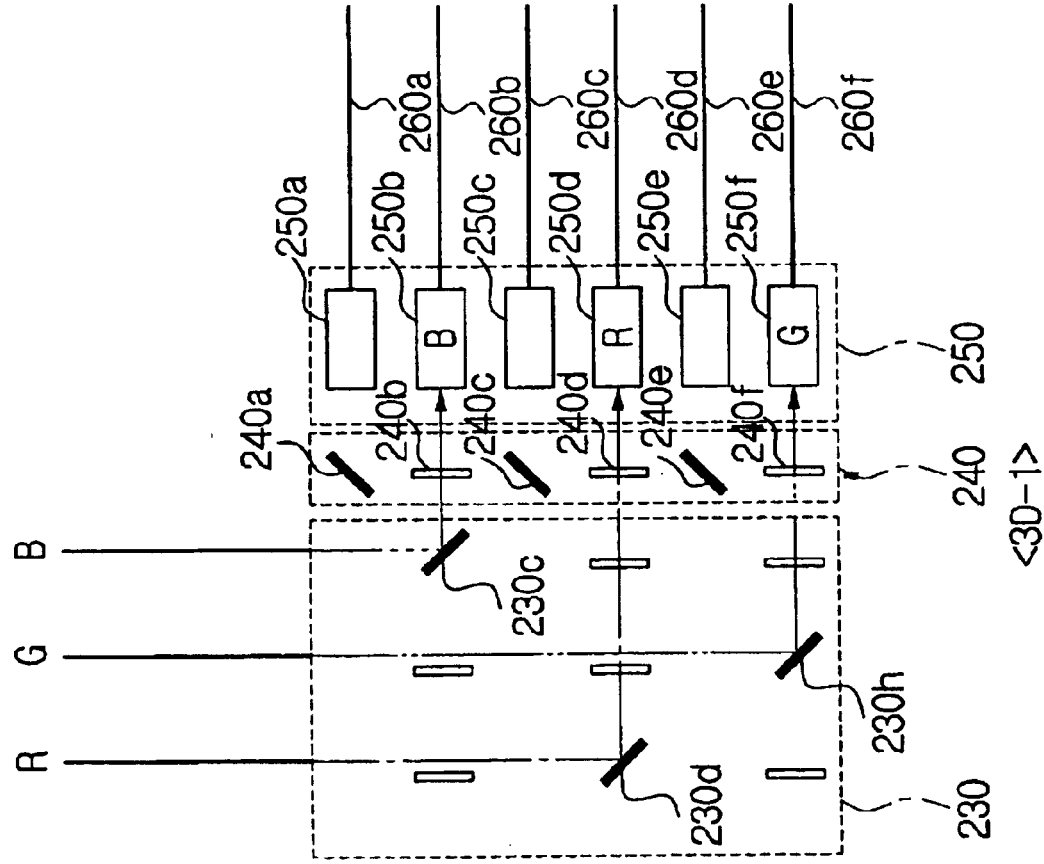

FIG. 3E
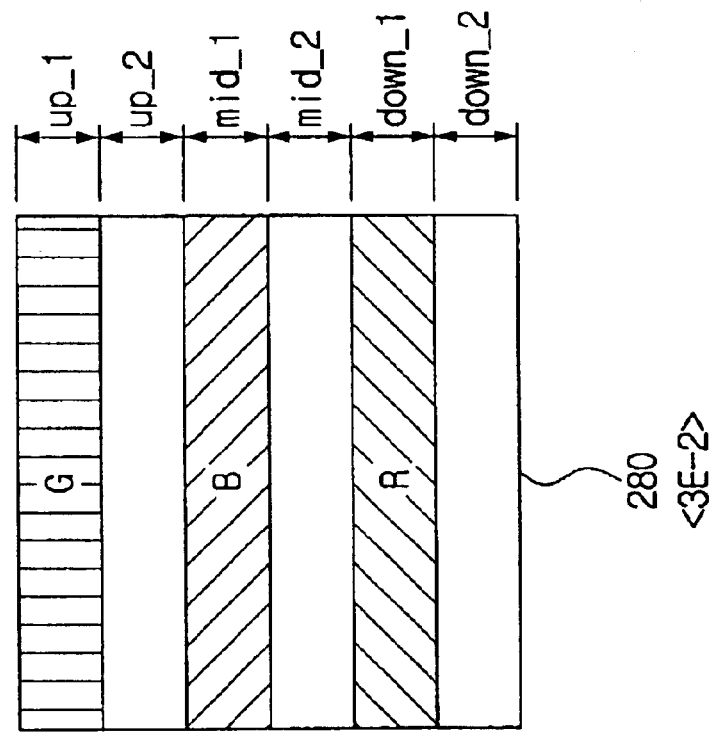
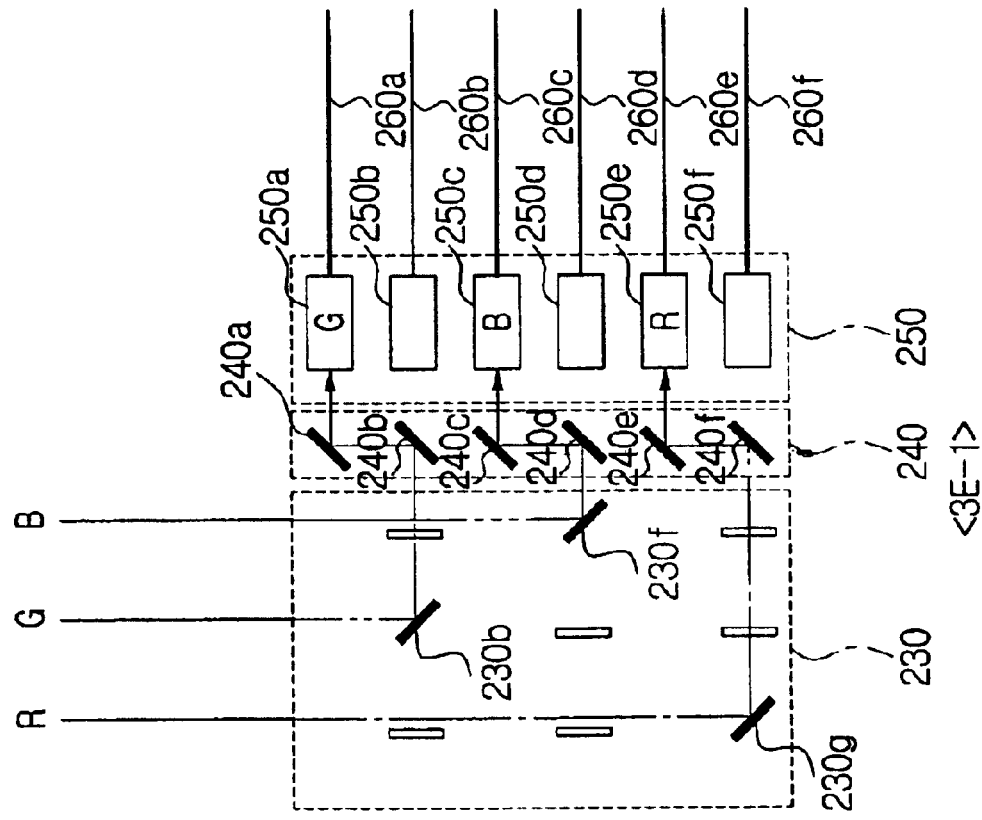

IMAGE PROJECTING APPARATUS HAVING OPTICAL SWITCH

CROSS-REFERENCE TO RELATED APPLICATIONS

The present Application claims priority from Korean Patent Application No. 10-2002-0056348 filed in the Republic of Korea on Sep. 17, 2002, which Korean Application is incorporated in full by reference herein.

BACKGROUND OF THE INVENTION

1. Field of the invention

The present invention relates to an image projecting apparatus, and more particularly, to an image projecting apparatus that realizes an image by using optical switches in a square matrix arrangement and optical switches in single file arrangement.

2. Description of the Related Art

A projector is an image projecting apparatus that displays an image by projecting an input image signal onto a screen. The image projecting apparatus is generally used in places such as presentation room, theater, and even a home.

Conventionally, a large screen image was realized by magnifying an image on a liquid crystal display (LCD) or a cathode ray tube (CRT) through a lens and then projecting it onto a screen. Although such an image may be enlarged, it is not provided at a high picture quality. In order to overcome this problem, an image projecting apparatus using a digital micromirror device (DMD) panel has been suggested.

The DMD is a semiconductor optical switch using a micromirror. The micromirror controls reflection of light in accordance with input of an image signal. Being digital, the DMD provides a high quality color representation and brightness. Furthermore, since there is no need for A/D or D/A conversion, a clearer image is obtainable.

FIG. 1 is a view showing a basic structure of a conventional image projecting apparatus using a color wheel.

Referring to FIG. 1, the conventional image projecting apparatus using a color wheel includes a light source 110, a color wheel 120, a DMD panel 130 and a projecting lens 140. In FIG. 1, the optical path of the white light is represented by one-dotted line.

The light source 110 irradiates a white light by using an arc lamp, or a laser. The color wheel 120 is rotated by a rotating means (not shown) in the arrowed direction. The color wheel 120 is divided into red (R), green (G) and blue (B) regions.

The white light, being emitted from the light source 110, is divided into red (R), green (G), and blue (B) beams through the R, G and B regions of the color wheel 120. The DMD panel 130 is provided with a plurality of micromirrors 130a. R, G and B beams are projected onto the DMD panel 130 and reflected from the micromirror 130a. The reflected R, G and B beams are transmitted through the projecting lens 140, and subsequently realize an image on the screen.

In the conventional image projecting apparatus 100 constructed as above, while the R beam passes through the R region of the color wheel 120 it can be evenly projected over the entire panel, with G and B beams blocked by the color filter. The same phenomenon also applies to G and B beams. That is, the luminosity used in the DMD panel 130 at any given time is only a third of the white light emitted from the light source 110, and thus, the brightness of the image also deteriorates.

In other words, reduction in luminosity at the DMD panel 130 causes degradation in light efficiency, and subsequently hinders maximization of the brightness of the image. Furthermore, 'overlapping phenomenon' occurs in which the respective beams on the panel partially overlap with each other at the respective adjoining areas.

SUMMARY OF THE INVENTION

Accordingly, it is an aspect of the present intention to provide an image projecting apparatus capable of improving light efficiency at a single panel, and removing partial overlapping of the respective beams at adjoining areas.

In order to achieve the above aspect and/or other features of the present invention, there is provided an image projecting apparatus, including a light source for irradiating a plurality of monochromatic lights of different wavelengths, a first light transmitting unit comprising a plurality of optical fibers through which the respective monochromatic lights pass, a first optical switch unit comprising a plurality of optical switches in a square matrix arrangement for selectively reflecting the monochromatic lights, a second optical switch unit comprising a plurality of optical switches in single file for reflecting and/or transmitting the monochromatic lights reflected from the first optical switch unit, the plurality of optical switches in odd-numbered rows being a first group while the optical switches in even-numbered rows being a second group, a square beam generator for transforming the monochromatic lights reflected from the second optical switch unit into a square beam of a predetermined aspect ratio, a panel unit for receiving the square beam of the monochromatic lights and realizing the received square beam in the form of a monochromatic color stripe of a predetermined size, and a projecting lens unit formed opposite to the panel unit, wherein either the first or the second group of the second optical switch unit periodically reflects the monochromatic lights.

According to the present invention, by using the optical switches in 3×3 matrix arrangement and optical switches in single file arrangement, light utilization can be improved, and partial overlapping of the monochromatic color stripes on the panel is prevented.

BRIEF DESCRIPTION OF THE DRAWINGS

The above objects and other features of the present invention will become more apparent by describing in detail a preferred embodiment thereof with reference to the attached drawings, in which:

FIG. 2 is a view illustrating the basic structure of an image projecting apparatus according to the present invention;

FIGS. 3A to 3F are views illustrating a method for realizing an image on a panel unit in certain order according to the manipulation on the first and the second optical switches of FIG. 2.

DETAILED DESCRIPTION OF THE PREFERRED EMBODIMENT

Figure 1:
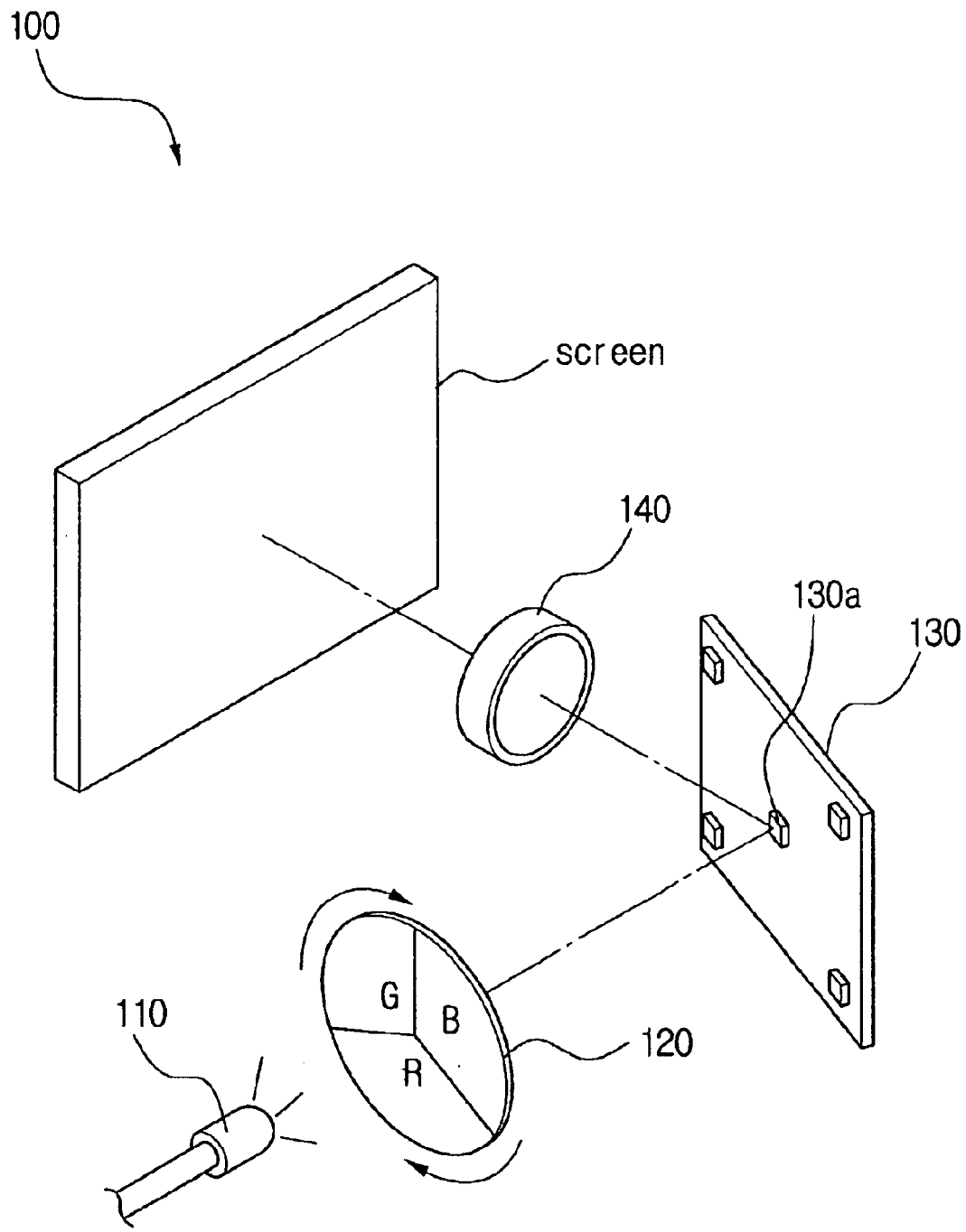
FIG. 1 is a view illustrating the basic structure of a conventional image projecting apparatus using a color wheel.

Hereinafter, the present invention will be described in detail with reference to the accompanying drawings.

FIG. 2 is a view showing the basic structure of an image projecting apparatus according to the present invention.

Referring to FIG. 2, the image projecting apparatus 200 according to the present invention includes a light source 210, a first light transmitting unit 220, a first light switch unit 230, a second light switch unit 240, an output port unit 250, a second light transmitting unit 260, a square beam generator 270, a diffuse lens 275, a panel unit 280 and a projecting lens unit 290.

The optical paths of the R, G and B laser beams in the first and the second optical switches 230, 240 of FIG. 2 are represented by one-, two- and three-dotted lines. For example, the optical path of the R laser beam reflected from an optical switch 230a and incident on the first output port 250a is represented by one-dotted line.

The light source 210 irradiates a plurality of monochromatic lights of different wavelengths. As for the light source 210, a laser, an arc lamp, a metal halide lamp, a halogen lamp or a xenon lamp may be used. In the present embodiment, R, G and B laser beams are used as the monochromatic lights.

The first light transmitting unit 220 includes a plurality of optical fibers 222a, 222b, 222c and a plurality of collimating lenses 224a, 224b, 224c. The R, G and B laser beams transmitted to the collimating lenses 224a, 224b, 224c through the optical fibers 222a, 222b, 222c are focused on the first optical switch unit 230.

The first light switch unit 230 includes a plurality of optical switches 230a to 230i that reflect or transmit the R, G and B laser beams. The plurality of optical switches 230a to 230i are formed in a m×m square matrix arrangement (m: integer≧3).

In this embodiment, the first optical switch unit 230 is formed in a 3×3 square matrix arrangement.

As for the optical switch, a high-reflective mirror made, for example, by using a micro electromechanical system (MEMS). The optical switch directly outputs the optical signal, i.e., the optical switch requires no process of converting the input optical signal (R, G and B laser beams) into electric signal. Accordingly, switching on/off can be carried out faster than the conventional switching that accompanies a process of converting optical signal into electrical signal.

The optical switch is provided with a reflective mirror and a driving part. On one surface of the reflective mirror is formed a high-reflective mirror which is made by the MEMS as a reflective surface that reflects a laser beam. The reflective mirror is moved between the first position (on-position) and the second position (off-position). The reflective mirror in on-position reflects the incident R, G and B laser beams in the optical switch to a predetermined part of the panel, while the reflective mirror in off-position causes the incident R, G and B laser beams in the optical switch to advance straightforward.

More specifically, the optical switch in on-position is at an inclined state, as the optical switches 230a, 230e, 230i and 240a to 240f shown in FIG. 2, reflecting the laser beam incident thereon. The optical switch in off-position is in a non-inclined state, as the optical switches 230b to 230d, and 230f to 230h shown in FIG. 2.

Referring back to FIG. 2, the first optical switch unit 230 is operated such that in each column and row, only one optical switch is operated in on-position at any given time, and that each of 3×3 switches is operated in on-position at least once.

For example, when one optical switch 230a is in the on-position, the other optical switches 230b, 230c, 230d, 230g in the same column and row are in the off-position. As the optical switch 230e is positioned in the on-position, the optical switch 230i is positioned in the on-position.

Only one optical switch of the first optical switch unit 230 is positioned in the on-position in each column and each row, and three optical switches, for example optical switches 230a, 230e, 230i, can be concurrently operated in the on-position.

Meanwhile, one frame is realized as the 3×3 optical switches, for example optical switches 230a, 230e, 230i, are concurrently positioned in the on-position. More specifically, one image is realized as each optical switch of each row is positioned in the on-position three times, i.e., as three optical switches of different columns and rows are operated in the on-position three times. The same optical switch is never positioned in the on-position again for that image once it has been in the on-position.

The second optical switch unit 240 is provided with a plurality of optical switches 240a to 240f that reflect and/or transmit the reflective laser beam from the first optical switch unit 230. The plurality of optical switches 240a to 240f are arranged in single file, and grouped into a first group of optical switches 240a, 240c, 240e in odd-numbered rows and a second group of optical switches 240b, 240d, 240f in even-numbered rows.

Preferably, either the first or the second group of optical switches of the second optical switch unit 240 may be set to the on-position all the time. For example, with the first group being maintained at the on-position, the second group periodically switches between the on- and off-positions.

In other words, with the second group of the second optical switch unit 240 being in the on-position, R laser beam reflected from one optical switch 230a of the first optical switch unit 230 is reflected from an optical switch 240b of the second group of optical switches of the second optical switch unit 240 to fall incident on the optical switch 240a of the first group of optical switches of the second optical switch unit 240. Similarly, a G laser beam reflected from an optical switch 230e is reflected from the optical switch 240d of the second group toward the optical switch 240c of the first group. Also, a B laser beam reflected from an optical switch 230i is reflected from the optical switch 240f of the second group toward the optical switch 240e of the first group.

Meanwhile, with the second group of the second optical switch unit 240 being positioned at off-position, R laser beam reflected from an optical switch 230a of the first optical switch unit 230 is passed through an optical switch 240b of the second group of optical switches of the second optical switch unit 240, and G laser beam reflected from an optical switch 230e is passed through an optical switch 240d of the second group, and B laser beam reflected from an optical switch 230i is passed through an optical switch 240f of the second group.

Provided at an output end of the second optical switch unit 240 is an output port unit 250. The output port unit 250 includes first to sixth output ports 250a to 250f that correspond to a plurality of optical switches 240a to 240f of the second optical switch unit 240.

The first to sixth output ports 250a to 250f transmit the reflective laser beams from the plurality of optical switches 240a to 240f to the second light transmitting unit 260. For example, the reflective laser beam from an optical switch 240a is incident on the first output port 250a and transmitted to the second optical fiber 260a of the second light transmitting unit 260.

The second light transmitting unit 260 includes a plurality of optical fibers 260a to 260f and a plurality of collimating lenses 262a to 262f. The collimating lenses 262a to 262f collimate the R, G and B laser beams from the optical fibers 260a to 260f into the square beam generator 270.

The square beam generator 70 is provided to an output end of the second light transmitting unit 260, and includes first to sixth square beam generators 270a to 270f.

The first to sixth square beam generators 270a to 270f transform focused R, G and B laser beams from the collimating lenses 262a to 262f into square beams, or a bar-type beams, of predetermined aspect ratios, respectively.

The first to sixth square beam generators 270a to 270f use a light tube or a light cube. The light tube is a hollow hexahedron, which has four inner sides made of mirror. An incident laser beam in the light tube is transformed into square beam and output.

Instead of a light tube, the square beam generator 270 may use an anamorphic lens. An anamorphic lens has different curvature along the horizontal and the vertical axes, and realizes a bar-type beam like a color stripe on the panel unit 280. A cylindrical lens is one example of the anamorphic lens.

The diffuse lens 275 diffuses the square laser beam to fall incident on the panel unit 280.

With the incident square laser beams from the diffuse lens 275, a monochromatic color stripe is formed on the panel unit 280 to a predetermined size. Each of the monochromatic color stripes represents R, G and B laser beams, and for a convenience in explanation, R, G and B monochromatic color stripes are illustrated by hatching, each by inclined lines, vertical lines and inverse-inclined lines.

The panel unit 280 is formed of a reflective panel, or a permissive panel. The reflective panel includes a digital micromirror device (DMD) panel, and a liquid crystal on silicon (LCOS) panel, and the permissive panel includes a liquid crystal display (LCD) panel or other such displays suitable for use with the present invention.

FIG. 2 shows the structure in which LCD panel is employed as a panel unit 280. For example, the panel unit 280 is divided into a first upper part up__1, a second upper part up__2, a first middle part mid__1, a second middle part mid__2, a first lower part down__1, and a second lower part down__2.

With the first and the second optical switch units 230, 240 driving as in FIG. 2, the R beam reflected from the optical switch 230*a* is reflected from the optical switches 240*b*, 240*a*. In this case, the R beam is passed through the first output port 250*a*, the optical fiber 260*a*, the collimating lens 262*a*, the first square beam generator 270*a* and the diffuse lens 275, and then incident on the first upper part up__1 of the panel unit 280. Together with this, the G beam is emitted onto the first lower part down__1 of the panel unit 280.

Meanwhile, with the DMD panel employed as a panel unit 280, the arrangement of the projecting lens unit 290 and the screen may vary. When the panel unit 280 is made of DMD panel, the movable mirror provided to the DMD panel time-divides the R, G and B monochromatic color stripes on the respective parts of the panel unit 280 and reflect them at a predetermined angle.

The projecting lens unit 290 is formed opposite to the panel unit 280, to magnify the incident monochromatic color stripe from the panel unit 280 and project onto the screen, thereby realizing an image thereon.

One screen image is realized as the respective nine optical switches 230*a* to 230*i* of the first optical switch unit 230 are positioned in the on-position in certain order and at least once.

FIGS. 3A to 3F are views illustrating a method of realizing a single screen image on the panel unit 280 in certain order according to manipulation on the first and the second optical switch units 230, 240 of FIG. 2.

FIGS. 3A to 3F also illustrate the example where the DMD panel, or the LCOS panel is employed as the panel unit 280.

Figure 3A:
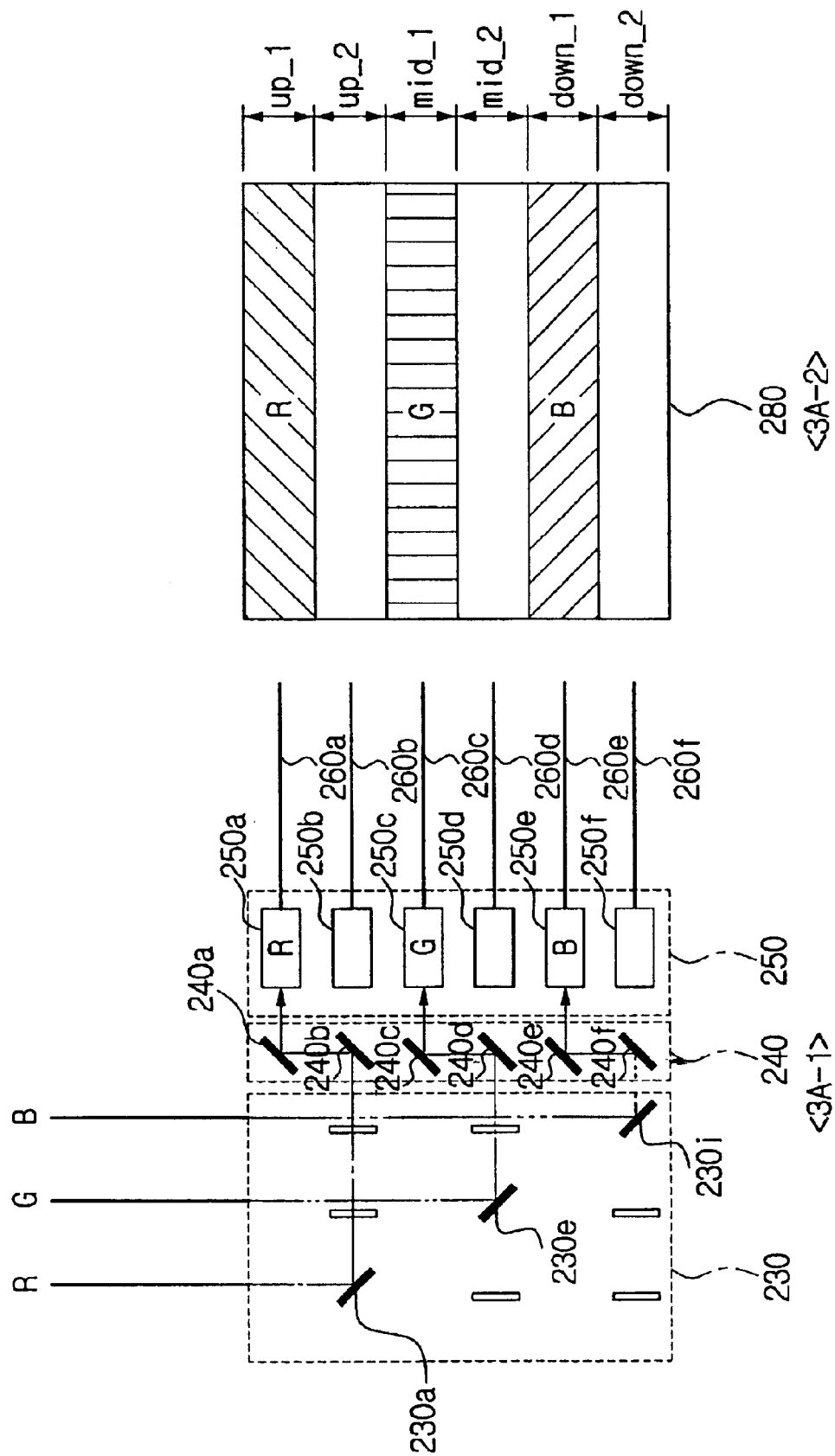
Figure 3B:
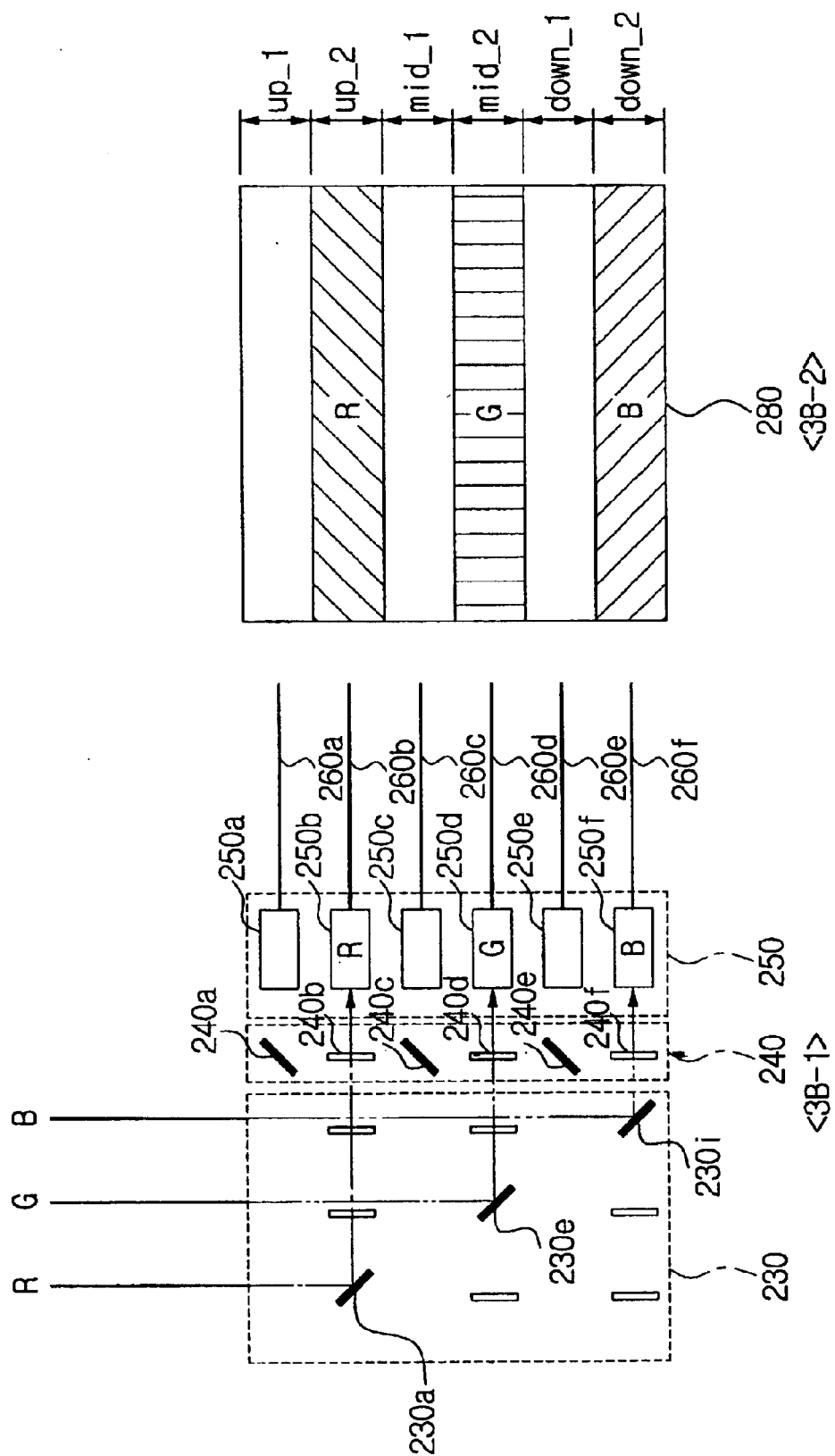
Figure 3F:
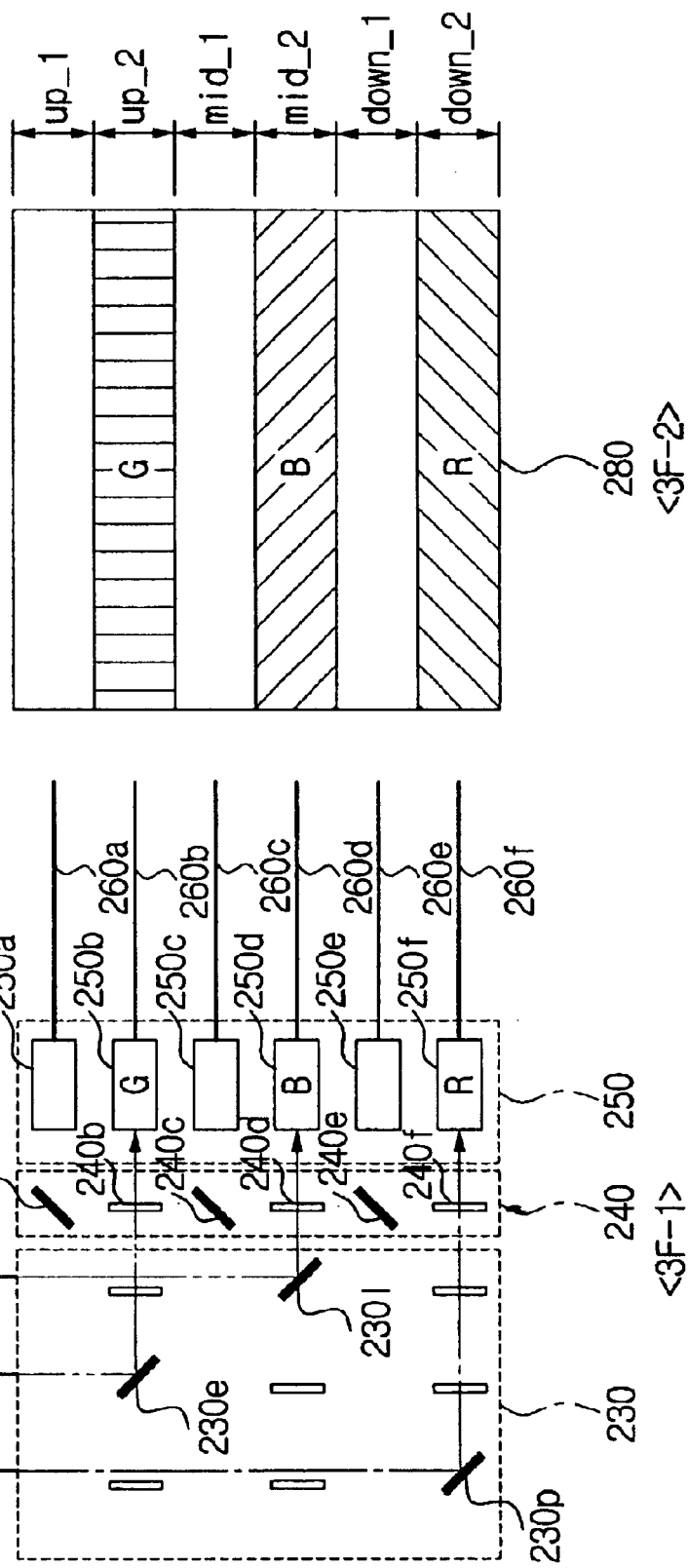

One screen image is realized as the processes of FIGS. 3A to 3F are carried out sequentially. The processes of FIGS. 3A to 3F are changeable. FIGS. 3A, 3C and 3E illustrate the operation of the optical switches when the second group of the second optical switch unit 240 is positioned in the on-position, while FIGS. 3B, 3D and 3F illustrate operation of the optical switches when the second group is positioned in the off-position.

R, G and B monochromatic color stripes are formed on first and second upper parts up__1, up__2, first and second middle parts mid__1, mid__2, and first and second lower parts down__1, down__2 by the manipulation on the first and the second optical switch units 230, 240.

The monochromatic color stripes on the panel unit 280 may be categorized into a first monochromatic stripe group including first upper part up__1, first middle part mid__1 and first lower part down__1, and a second monochromatic stripe group including second upper part up__2, second middle part mid__2, and second lower part down__2. The respective monochromatic color stripes are almost concurrently displayed on the panel unit 280, while the first monochromatic stripe group and the second monochromatic stripe group are sequentially displayed on the panel unit 280.

Referring first to FIG. 3A, the first and the second optical switch units 230, 240 are driven in the manner as listed in the table 1.

TABLE 1

|  | RED | GREEN | BLUE | 2nd optical switch unit | Output port unit |
|---|---|---|---|---|---|
| 1st optical switch unit | 230a: ON | 230b: OFF | 230c: OFF | 240a: ON | 250a: RED |
|  |  |  |  | 240b: ON | 250b: — |
|  | 230d: ON | 230e: ON | 230f: OFF | 240c: ON | 250c: GREEN |
|  | OFF |  |  | 240d: ON | 250d: — |
|  | 230g: OFF | 230h: OFF | 230i: ON | 240e: ON | 250e: BLUE |
|  |  |  |  | 240f: ON | 250f: — |

RED represents R beam, GREEN represents G beam and BLUE represents B beam. ON represents the optical switch in on-position where the laser beam is reflected, while OFF represents the optical switch in off-position where the laser beam is passed through. Reference numerals 230*a* to 230*i*, and 240*a* to 240*f* represent respective optical switches.

When the optical switches 230*a* to 230*i*, and 240*a* to 240*f* of the first and the second optical switch units 230, 240 are driven as shown in Table 1, i.e., driven as shown in <3A-1> of FIG. 3A, monochromatic color stripes are formed as shown in <3A-2> of FIG. 3A.

For example, R laser beam is reflected from the optical switches in the order of 230*a*→240*b*→240*a* to fall incident on the first output port 250*a*. Then through the optical fiber 260*a*, the R laser beam is passed and then formed on the first upper part up__1 of the panel unit in the form of a monochromatic color stripe. G and B laser beams are formed on the first middle part mid__1 and the first lower part down__1 of the panel unit 280 in the monochromatic color stripes, respectively.

Referring to FIG. 3B, the first and the second optical switch units 230, 240 are driven in the manner as listed in the table 2.

TABLE 2

|  | RED | GREEN | BLUE | 2nd optical switch unit | Output port unit |
|---|---|---|---|---|---|
| 1st optical switch unit | 230a: ON | 230b: OFF | 230c: OFF | 240a: ON | 250a: — |
|  |  |  |  | 240b: OFF | 250b: RED |
|  | 230d: OFF | 230e: ON | 230f: OFF | 240c: ON | 250c: — |
|  |  |  |  | 240d: OFF | 250d: GREEN |
|  | 230g: OFF | 230h: FF | 230i: ON | 240e: ON | 250e: — |
|  |  |  |  | 240f: OFF | 250f: BLUE |

RED represents R beam, GREEN represents G beam and BLUE represents B beam. ON represents the optical switch in on-position where the laser beam is reflected, while OFF represents the optical switch in off-position where the laser beam is passed through. Reference numerals 230a to 230i, and 240a to 240f represent respective optical switches.

When the optical switches 230a to 230i, and 240a to 240f of the first and the second optical switch units 230, 240 are driven as shown in Table 2, i.e., driven as shown in <3B-1> of FIG. 3B, monochromatic color stripes are formed on the panel unit 280 as shown in <3B-2> of FIG. 3B.

Referring to FIG. 3C, the first and the second optical switches 230, 240 are driven in the manner as listed in the table 3.

TABLE 3

| | RED | GREEN | BLUE | 2nd optical switch unit | Output port unit |
|---|---|---|---|---|---|
| 1st optical switch unit | 230a: OFF | 230b: OFF | 230c: ON | 240a: ON | 250a: BLUE |
| | | | | 240b: ON | 250b: — |
| | 230d: ON | 230e: OFF | 230f: OFF | 240c: ON | 250c: RED |
| | | | | 240d: ON | 250d: — |
| | 230g: OFF | 230h: ON | 230i: OFF | 240e: ON | 250e: GREEN |
| | | | | 240f: ON | 250f: — |

RED represents R beam, GREEN represents G beam and BLUE represents B beam. ON represents the optical switch in on-position where the laser beam is reflected, while OFF represents the optical switch in off-position where the laser beam is passed through. Reference numerals 230a to 230i, and 240a to 240f represent respective optical switches.

When the optical switches 230a to 230i, and 240a to 240f of the first and the second optical switch units 230, 240 are driven as shown in Table 3, i.e., driven as shown in <3C-1> of FIG. 3C, monochromatic color stripes are formed on the panel unit 280 as shown in <3C-2> of FIG. 3C.

Referring to FIG. 3D, the first and the second optical switches 230, 240 are driven in the manner as listed in the table 4.

TABLE 4

| | RED | GREEN | BLUE | 2nd optical switch unit | Output port unit |
|---|---|---|---|---|---|
| 1st optical switch unit | 230a: OFF | 230b: OFF | 230c: ON | 240a: ON | 250a: — |
| | | | | 240b: OFF | 250b: BLUE |
| | 230d: ON | 230e: OFF | 230f: OFF | 240c: ON | 250c: — |
| | | | | 240d: OFF | 250d: RED |
| | 230g: OFF | 230h: ON | 230i: OFF | 240e: ON | 250e: — |
| | | | | 240f: OFF | 250f: GREEN |

RED represents R beam, GREEN represents G beam and BLUE represents B beam. ON represents the optical switch in on-position where the laser beam is reflected, while OFF represents the optical switch in off-position where the laser beam is passed through. Reference numerals 230a to 230i, and 240a to 240f represent respective optical switches.

When the optical switches 230a to 230i, and 240a to 240f of the first and the second optical switch units 230, 240 are driven as shown in Table 4, i.e., driven as shown in <3D-1> of FIG. 3D, monochromatic color stripes are formed on the panel unit 280 as shown in <3D-2> of FIG. 3D.

Referring to FIG. 3E, the first and the second optical switches 230, 240 are driven in the manner as listed in the table 5.

TABLE 5

| | RED | GREEN | BLUE | 2nd optical switch unit | Output port unit |
|---|---|---|---|---|---|
| 1st optical switch unit | 230a: OFF | 230b: ON | 230c: OFF | 240a: ON | 250a: GREEN |
| | | | | 240b: ON | 250b: — |
| | 230d: OFF | 230e: OFF | 230f: ON | 240c: ON | 250c: BLUE |
| | | | | 240d: ON | 250d: — |
| | 230g: ON | 230h: OFF | 230i: OFF | 240e: ON | 250e: RED |
| | | | | 240f: ON | 250f: — |

RED represents R beam, GREEN represents G beam and BLUE represents B beam. ON represents the optical switch in on-position where the laser beam is reflected, while OFF represents the optical switch in off-position where the laser beam is passed through. Reference numerals 230a to 230i, and 240a to 240f represent respective optical switches.

When the optical switches 230a to 230i, and 240a to 240f of the first and the second optical switch units 230, 240 are driven as shown in Table 5, i.e., driven as shown in <3E-1> of FIG. 3E, monochromatic color stripes are formed on the panel unit 280 as shown in <3E-2> of FIG. 3E.

Referring to FIG. 3F, the first and the second optical switches 230, 240 are driven in the manner as listed in the table 6.

TABLE 6

| | RED | GREEN | BLUE | 2nd optical switch unit | Output port unit |
|---|---|---|---|---|---|
| 1st optical switch unit | 230a: OFF | 230b: ON | 230c: OFF | 240a: ON | 250a: — |
| | | | | 240b: OFF | 250b: GREEN |
| | 230d: OFF | 230e: OFF | 230f: ON | 240c: ON | 250c: — |
| | | | | 240d: OFF | 250d: BLUE |
| | 230g: ON | 230h: OFF | 230i: OFF | 240e: ON | 250e: — |
| | | | | 240f: OFF | 250f: RED |

RED represents R beam, GREEN represents G beam and BLUE represents B beam. ON represents the optical switch in on-position where the laser beam is reflected, while OFF represents the optical switch in off-position where the laser beam is passed through. Reference numerals 230a to 230i, and 240a to 240f represent respective optical switches.

When the optical switches 230a to 230i, and 240a to 240f of the first and the second optical switch units 230, 240 are driven as shown in Table 6, i.e., driven as shown in <3F-1> of FIG. 3F, monochromatic color stripes are formed on the panel unit 280 as shown in <3F-2> of FIG. 3F.

As described above, a single screen image is realized as the processes of FIGS. 3A to 3F are performed in order. Preferably, the first and the second groups are discontinuously performed, i.e., performed at predetermined time intervals.

Figure 4:
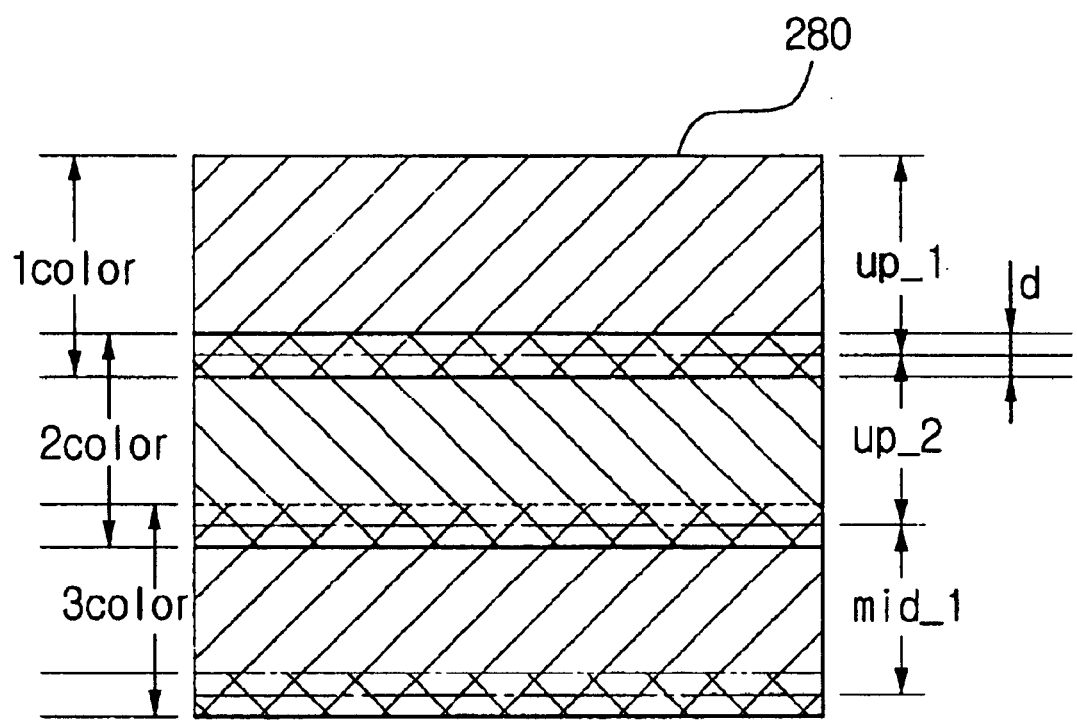
FIG. 4 is a view illustrating a method for realizing a monochromatic stripe formed on the DMD panel of FIG. 2.

FIG. 4 is a view illustrating a method for realizing a monochromatic color stripe on the DMD panel as the panel unit 280 of FIG. 2.

Referring to FIG. 4, a method for solving the overlapping phenomenon of the monochromatic color stripes on the first and the second upper parts up__1, up__2 and the first middle part mid__1 at adjoining areas, will be described.

FIG. 4 illustrates a part of the panel unit 280, i.e., the first and the second upper parts up__1, up__2, and the first middle part mid__1. On the first upper part up__1 is formed a first monochromatic color stripe (1color) from the laser beam reflected from the first row, for instance from optical switch 240a, and on the second upper part up__2 of the panel unit 280 is formed a second monochromatic color stripe (2color) from the laser beam reflected from the second row, for instance from the optical switch 240b. For easy reference, the first monochromatic color stripe (1color) is represented by hatching of inclined lines, while the second monochromatic color stripe (2color) is represented by hatching of inverse-inclined lines.

The area where the inclined and inverse-inclined lines meet represents an overlapping area between the first and the second monochromatic color stripes (1color, 2color). This area is formed as the first monochromatic color stripe (1color) and then the second monochromatic color stripe (2color) is formed while partially overlapping on the lower portion of the first monochromatic color stripe (1color) by a distance 'd'.

In reality, however, the monochromatic color stripes on the panel unit 280 do not overlap because of the movable mirror. The movable mirror is driven such that the first monochromatic color stripe (1color) is formed on the first upper part up__1 which includes an upper half of the overlapping distance 'd'.

Then after the formation of the first monochromatic color stripe (1color), by the movable mirror, the second monochromatic color stripe (2color) is formed to include a lower half of the overlapping distance 'd'. In other words, the second monochromatic color stripe (2color) is formed as long as the second upper part up__2. The above applies to the formation of the third monochromatic color stripe (3color) formed on the first middle part mid__1.

As described above, by the driving of the first and the second optical switch units 230, 240 and the panel unit 280, monochromatic stripes can be formed without overlapping each other.

Meanwhile, referring to FIG. 4, light efficiency rate at the panel unit 280 formed of DMD panel will be described.

$$\text{Light efficiency} = \left(\frac{SAI}{SOI}\right) < 100\%$$

where SAI represents the sum of actual image display areas on the panel, and SOI represent the sum of the overlapping image display areas on the panel. In other words, the SAI represents the sum of the first upper part up__1 and the second lower part down__2 of the panel unit 280. Accordingly, less SOI means higher light efficiency rate.

According to the present invention, by using the optical switches in 3×3 matrix arrangement and optical switches in single file, the overlapping of the monochromatic color stripes on the panel can be prevented. More specifically, overlapping can be prevented by dividing the optical switches in single file into odd-numbered rows and even-numbered rows and thus driving the optical switches of each group alternately. Furthermore, by sequentially realizing monochromatic color stripes on the panel through the use of optical switches of MEMS technology, the light utilization can be much improved. As a result, luminosity and light efficiency improve and thus, the brightness of images improves.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. An image projecting apparatus, comprising:

a light source configured to irradiate a plurality of monochromatic lights of different wavelengths;

a first light transmitting unit comprising a plurality of optical fibers through which the respective monochromatic lights pass;

a first optical switch unit comprising a plurality of optical switches in a square matrix arrangement operated to selectively reflect the monochromatic lights;

a second optical switch unit comprising a plurality of optical switches arranged in a single file configured to one of reflect and transmit the monochromatic lights reflected from said first optical switch unit, the plurality of optical switches comprising a first group of optical switches arranged in odd-numbered rows and a second group of optical switches arranged in even-numbered rows;

a square beam generator configured to transform the monochromatic lights reflected from said second optical switch unit into square beams of a predetermined aspect ratio;

a panel unit configured to receive the square beams of the monochromatic lights to realize the received square beams in the form of a monochromatic color stripe of a predetermined size; and wherein either the first or the second group of said second optical switch unit periodically reflects the monochromatic lights.

2. The image projecting apparatus of claim 1, wherein the optical switches of the pluralities of optical switches of said first and said second optical switch units are moved between a first position to reflect the monochromatic lights and a second position to pass the monochromatic lights.

3. The image projecting apparatus of claim 2, wherein at any particular instant only one optical switch in each column and each row of said first optical switch unit is positioned in the first position.

4. The image projecting apparatus of claim 2, wherein at any particular instant, only one of the first group and the second group of said second optical switch unit is positioned in the first position.

5. The image projecting apparatus of claim 1, wherein said first optical switch unit comprises optical switches in a 3×3 square matrix arrangement, while said second optical switch unit comprises optical switches in a 6×1 matrix arrangement.

6. The image projecting apparatus of claim 1, further comprising a second light transmitting unit comprising a plurality of optical fibers configured to transmit the monochromatic lights transmitted from said second optical switch unit to said square beam generator.

7. The image projecting apparatus of claim 1, wherein said panel unit includes a digital micromirror lens device configured to transform the plurality of monochromatic color stripes and to reflect the monochromatic color stripes to said projecting lens unit.

* * * * *